Sept. 26, 1967 L. M. HURST 3,344,292
ELECTRIC MOTOR CLUTCH AND BRAKE
Filed March 30, 1964 2 Sheets-Sheet 1
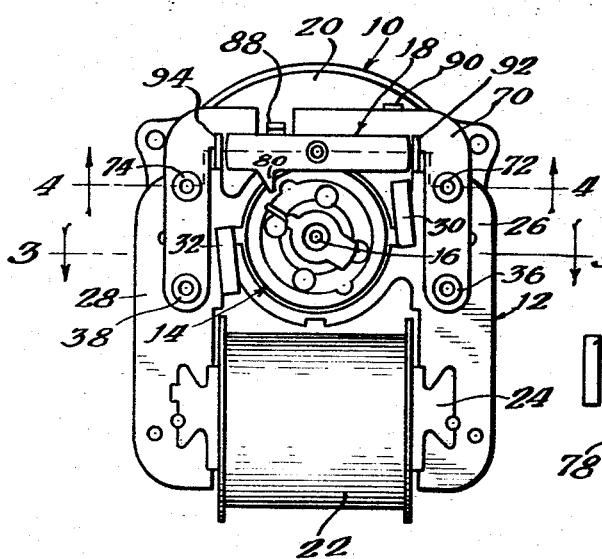
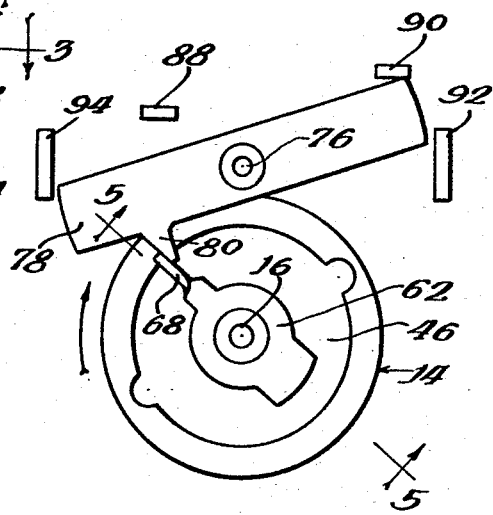
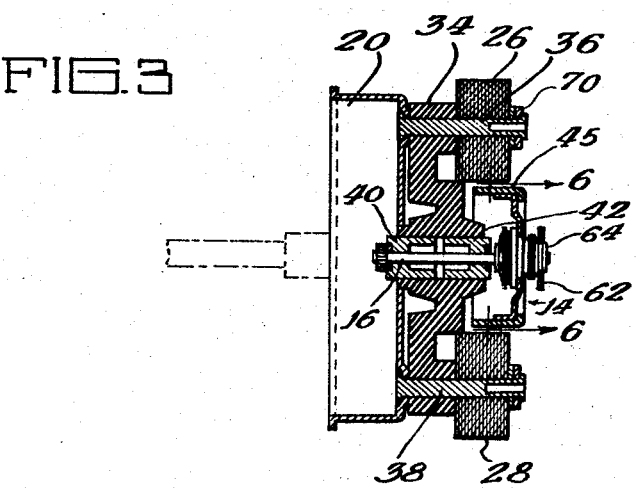
Inventor:
Leslie M Hurst
By: Stone, Nieman,
Burmeister & Zummer
Attorneys Sept. 26, 1967 L. M. HURST 3,344,292
ELECTRIC MOTOR CLUTCH AND BRAKE
Filed March 30, 1964 2 Sheets-Sheet 2
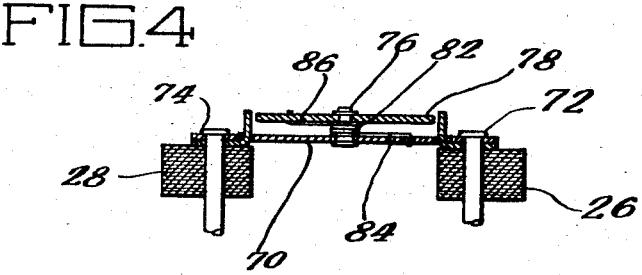
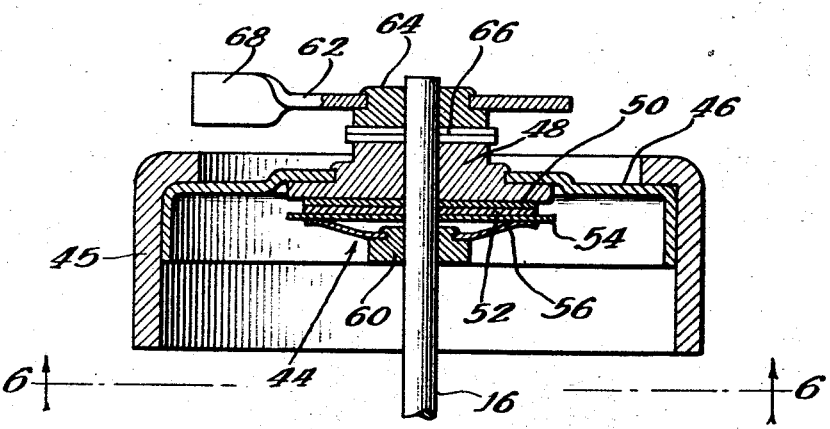
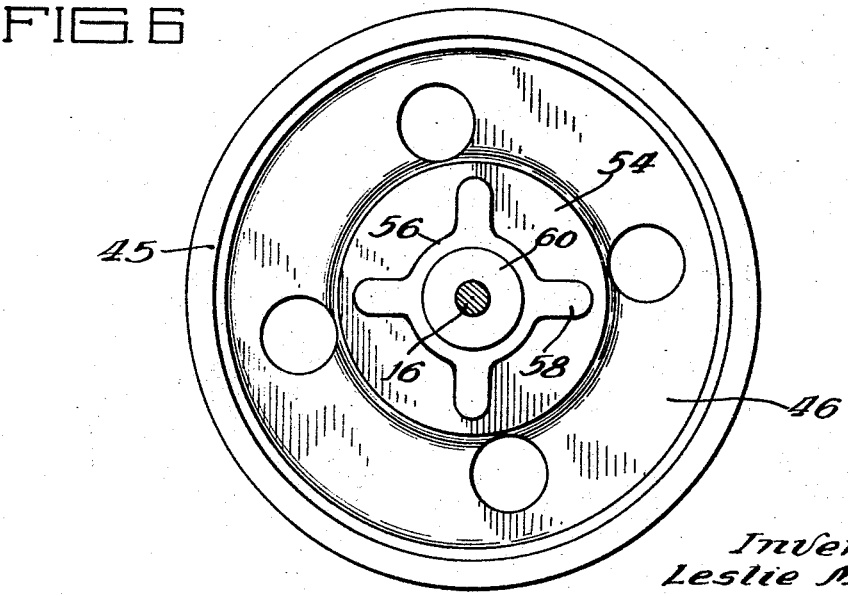
Inventor:
Leslie M. Hurst
By: Stone, Nieman,
Burmeister & Zimmer
Attorneys

United States Patent Office 3,344,292
Patented Sept. 26, 1967

3,344,292
ELECTRIC MOTOR CLUTCH AND BRAKE
Leslie M. Hurst, Princeton, Ind., assignor to Hurst Manufacturing Corporation, Princeton, Ind., a corporation of Indiana
Filed Mar. 30, 1964, Ser. No. 355,704
3 Claims. (Cl. 310—76)

This invention relates to an electric motor and more particularly to an electric motor construction in which an electric motor shaft is stopped immediately after electric current to the motor is interrupted.

In many applications of electric motors, it is desirable to stop the output from the electric motor within a short span of time. It may be appreciated that without some braking device, an electric motor shaft would continue to rotate because of the inertia of the rotor, as well as, the inertia of the shaft if no brake is provided. Various brakes for a motor are available, but most brakes attempt to overcome the inertia of the rotor as well as that of the shaft, thus, the brakes must be substantial in size and expensive in construction. It is readily apparent that when a control is utilized in which the shaft of the motor is stopped when current to the motor is interrupted, it is immaterial whether the rotor of the motor continues to rotate as long as the motor's shaft is stopped almost simultaneously with the interruption of current to the motor. It is, therefore, a principal object of the herein-disclosed invention to provide an improved electric motor construction in which rotation of the output shaft is stopped immediately after interruption of current to the motor, and the rotor is allowed to rotate after the shaft is stopped so that a lower braking force is required to overcome the inertia of the rotor to stop the rotor.

It is another object of the present invention to provide an inexpensive construction for stopping the rotation of an electric motor output shaft upon interruption of current to the electric motor.

It is a further object of this invention to provide an electric motor construction in which there is a positive action of stopping rotation of an output shaft upon interruption of current to an electric motor.

Other objects and uses of the present invention will become readily apparent to those skilled in the art upon a perusal of the following specification in the light of the accompanying drawings, in which:

FIGURE 1 is an end view of a shaded pole electric motor embodying the herein-disclosed invention;

FIGURE 2 is an enlarged fragmentary view of a portion of a braking mechanism of the motor shown in FIGURE 1 showing a pawl in engagement with a stop arm to prevent rotation of an output shaft;

FIGURE 3 is a cross-sectional view taken on line 3—3 of FIGURE 1 showing some of the details of construction of the present device;

FIGURE 4 is a cross-sectional view taken on line 4—4 of FIGURE 1;

FIGURE 5 is an enlarged cross-sectional view taken on line 5—5 of FIGURE 2; and

FIGURE 6 is a cross-sectional view taken on line 6—6 of FIGURE 3.

Referring now to the drawings and especially to FIGURES 1 and 3, a shaded pole electric motor generally indicated by numeral 10 is shown therein. The motor 10 generally includes a field generator 12, a rotor 14 rotatably mounted adjacent to the field generator, an output shaft 16 rotatably supporting the rotor, a brake mechanism 18 mounted on the field generator 12 for controlling rotation of shaft 16, and a conventional gear transmission unit 20 connected to shaft 16.

The field generator is conventional in its construction inasmuch as it includes a coil 22 having a yoke 24 which couples the flux generated in the coil with a pair of pole pieces 26 and 28. Conventional shading coils 30 and 32 are conventionally mounted on pole pieces 26 and 28, respectively.

A molded phenolic bearing housing 34 is positioned between the pole pieces and the gear transmission unit 20. A pair of rivets 36 and 38 hold the pole pieces, bearing housing and gear transmission unit together to form a unitary construction. A pair of Phosphor-bronze bearings 40 and 42 are mounted in the bearing housing to support rotatably shaft 16.

Shaft 16 is drivingly connected to the rotor by means of a friction clutch 44, illustrated in FIGURE 5, which acts as a friction drive between the two members. The rotor is the form of a ferromagnetic cylinder 45 mounted coaxially on the shaft 16 by an aluminum spider 46 which has a bearing 48 mounted therein rotatably supporting the rotor on the shaft. The friction clutch includes a rotor friction plate or surface 50 which is fixed to the bearing 48 and a shaft friction plate or surface 52 which mates with friction plate 50 and is in frictional driving connection therewith. A spring plate 54 is fixed to the friction plate 52. Fixed to the spring plate 54 is a drive spring 56 which has a plurality of resilient arms 58 which may be best seen in FIGURES 5 and 6. The spring 56 is fixed to a spring mount collar 60 which is fixed to shaft 16 so that the arms of spring 56 hold the friction plates in frictional engagement for driving and braking as will be seen hereinafter.

The brake mechanism selectively controls rotation of the shaft 16. Included in the brake mechanism, as illustrated in FIGURES 1, 3 and 4, is a stop arm 62 which is fixed to a stop arm collar 64 which in turn is fixed to shaft 16. A thrust bearing 66 is positioned between the stop arm collar and bearing 48. The stop arm includes a hand 68 which provides a convenient surface for engaging the pawl to be described hereinafter. A generally U-shaped support 70 is fixed to the pole pieces by rivets 36 and 38 and a second pair of rivets 72 and 74 which also extend through the pole pieces. A pivot shaft 76 is fixed to support 70 of non-magnetic material such as brass or aluminum, and a bar 78 is pivotedly mounted on the shaft. The bar 78 has a pawl 80 formed integral therewith, which pawl is engageable with hand 68 to hold in one direction shaft 16. A bar spring 82 is wound on the pivot shaft 76 and has one arm 84 in engagement with support 70 and a second arm 86 in engagement with bar 78 to urge constantly pawl 80 into an attitude in which it is engageable with hand 68. The support 70 has a pair of stops 88 and 90 formed therein and engageable with the bar to limit the rotation of the bar about pivot shaft 76.

A pair of secondary poles 92 and 94 are mounted on pole pieces 26 and 28, respectively. These secondary pole pieces are positioned adjacent to opposite ends of bar 78 which is made of a ferromagnetic material, so that the leakage flux through the two flux conductors, that is, the secondary pole pieces 92 and 94, holds the bar 78 in alignment with the secondary pole pieces to hold the bar in an attitude whereby the pawl 80 is not engageable with hand 68.

In normal operation of the instant motor, a source of electrical current is provided to the coil 22 and the pole pieces are excited to cause rotor 14 to rotate. It may be appreciated that as the rotor rotates, the friction clutch 42 drives the drive shaft 16, which is connected to the gear transmission unit. The operation of the pole pieces as well as the shading coil is that of the normal operation of a shaded pole motor.

The instant motor construction allows the output shaft to be stopped immediately after the current is interrupted to the coil 22. As was mentioned above, when the motor is operating, a magnetic potential develops on the secondary poles 92 and 94, which take the form of ears adjacent to ends of the bar 78. Magnetic flux flows through the bar between the secondary poles to attract the bar into alignment with the poles 92 and 94 and hold the bar in alignment with the secondary pole pieces against the force of spring 68. However, when the current to the coil is interrupted, the field generator ceases to produce a field; thus the flux between the secondary pole pieces is interrupted, and the spring 82 then pivots the bar 78 in a counterclockwise direction to an attitude shown in FIGURE 2, in which the arm engages the stop 90. The shaft 16 rotates with the stop arm 62 until the hand 68 engages the pawl 80. It may be appreciated that the shaft is then stopped immediately. Although the shaft is stopped, the rotor continues to rotate inasmuch as the drive between the shaft and the rotor is a friction drive in the form of friction clutch 44. Inasmuch as there is a frictional connection between the rotor and the shaft, there is a drag on the rotor to slow down the rotor in a relatively short time; however, a substantial force is not required to stop the rotor immediately.

It may be readily appreciated that the instant construction allows the output shaft to be stopped immediately after the current to the motor is interruped, although the rotor is brought to a slow stop thereby reducing shock loading on the brake mechanism. It should be noted that since flux leakage is utilized to hold the bar in an inactive attitude, the bar is shifted to an active attitude immediately after the current is interrupted. The shaft which has a small amount of inertia relative to the rotor is stopped immediately by using a single relatively light weight brake, whereas the rotor which has a substantially greater amount of inertia is stopped slowly by the friction clutch.

Although a specific embodiment of the herein-disclosed invention has been shown and described above, it is readily apparent that those skilled in the art may make various changes and modifications, such as, using other types of electric motors with the present invention. It is to be expressly understood that this invention is limited only by the appended claims though a specific construction is shown and described herein.

What is claimed is:

1. An electric motor comprising, in combination, a coil having a ferromagnetic yoke, two primary ferromagnetic pole pieces extending from opposite ends of the yoke on opposite sides of an axis therebetween, a shaft rotatably mounted on said axis, a rotor mounted on the shaft for rotation between the primary pole pieces, said rotor being adapted to rotate responsive to a magnetic flux between the primary pole pieces, a stop member mounted on the shaft for rotation therewith and protruding therefrom, a bar of ferromagnetic material having two ends, said bar being pivotally mounted between the ends thereof on an axis parallel to the shaft and spaced from the shaft by a distance greater than the distance the stop member protrudes from the shaft, said bar having a pawl extending therefrom toward the stop member, and said bar having a first rotational position, in the absence of said magnetic flux in which the pawl engages the stop member and a second rotational position, in the presence of said magnetic flux, in which the pawl is spaced from all positions of the stop member, two secondary ferromagnetic pole pieces extending from the two primary pole pieces, respectively, said secondary pole pieces being disposed and spaced from opposite ends of the bar, the ferromagnetic bar forming a low reluctance path between the secondary pole pieces and spring means urging the bar into its first rotational position.

2. An electric motor comprising the combination of claim 1 wherein the rotor comprises a hub affixed to the shaft, a second hub journaled about the shaft adjacent to the first hub, said first hub carrying a first flat surface confronting the second hub and the second hub carrying a second flat surface in functional engagement with the first flat surface, a non-magnetic spider fixed on said second hub and rotatable therewith, a cylindrical ferromagnetic rotator affixed to the spider and disposed between the part cylindrical surfaces of the pole pieces, said rotor being coaxial with the axis of said part cylindrical surfaces and spaced therefrom, a third hub affixed to the shaft on the side of the second hub opposite the first circular hub, a first disc disposed between the third hub and the second hub, a second circular disc of resilient material mounted coaxially on the third hub having a plurality of outwardly extending arms engaging the first disc and spring biasing the first disc toward the second hub, the second hub and first disc having abutting flat surfaces in frictional engagement.

3. An electric motor comprising the combination of claim 1 in combination with a first mechanical stop and a second mechanical stop limiting rotation of the bar between the first and second positions thereof.

References Cited

UNITED STATES PATENTS

| | | | |
|---|---|---|---|
| 521,138 | 6/1894 | Crowdus | 310—77 |
| 1,930,159 | 10/1933 | Crilly | 192—142 |
| 2,539,836 | 1/1951 | Hoffman | 310—77 |
| 2,575,442 | 11/1951 | Cooley | 310—76 |
| 2,857,750 | 10/1958 | Fox | 64—30 |
| 2,897,384 | 7/1959 | Muller | 310—261 |

MILTON O. HIRSHFIELD, *Primary Examiner.*

J. D. MILLER, *Assistant Examiner.*